(12) United States Patent
Howarter et al.

(10) Patent No.: US 9,167,307 B2
(45) Date of Patent: *Oct. 20, 2015

(54) ON-SCREEN CALLER ID WITH VIDEO PLAYBACK AND STORAGE CAPABILITY

(71) Applicant: CenturyLink Intellectual Property LLC, Denver, CO (US)

(72) Inventors: Jamie C. Howarter, Overland Park, KS (US); Charles M. Lesher, Louisburg, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/334,546

(22) Filed: Jul. 17, 2014

(65) Prior Publication Data

US 2014/0327726 A1   Nov. 6, 2014

Related U.S. Application Data

(63) Continuation of application No. 13/248,969, filed on Sep. 29, 2011, now Pat. No. 8,817,062.

(51) Int. Cl.

| | |
|---|---|
| *H04N 7/14* | (2006.01) |
| *H04M 11/00* | (2006.01) |
| *H04M 1/56* | (2006.01) |
| *H04N 21/488* | (2011.01) |
| *H04N 21/4788* | (2011.01) |
| *H04L 29/06* | (2006.01) |
| *H04M 3/42* | (2006.01) |

(52) U.S. Cl.
CPC ........ *H04N 21/4882* (2013.01); *H04L 65/1069* (2013.01); *H04L 65/1096* (2013.01); *H04M 3/42042* (2013.01); *H04N 7/147* (2013.01); *H04N 21/4788* (2013.01); *H04M 2201/50* (2013.01)

(58) Field of Classification Search
CPC ... H04M 1/57; H04M 1/642; H04M 3/42017; H04M 3/436; H04M 3/4872; H04N 7/147
USPC .................. 379/93.23, 93.24, 93.25, 142.01, 379/142.07, 142.16; 348/14.01
See application file for complete search history.

(56) References Cited

U.S. PATENT DOCUMENTS

| | | |
|---|---|---|
| 6,603,840 B2 | 8/2003 | Fellingham et al. |
| 7,379,455 B2 | 5/2008 | Pickett |

(Continued)

OTHER PUBLICATIONS

U.S. Appl. No. 13/248,969; Non-Final Rejection dated Jul. 8, 2013; 13 pages.

(Continued)

*Primary Examiner* — Quoc D Tran
(74) *Attorney, Agent, or Firm* — Swanson & Bratschun, L.L.C.

(57) ABSTRACT

Novel tools and techniques to enable video enhancements identifying the calling party of an incoming telephone call. In an aspect of some such tools, a video message from the calling party is sent to the receiving party through a communication channel in the provider network. Upon receiving an incoming telephone call at the provider network, the video message can be associated with the incoming telephone call, and routed to a video screen associated with the receiving party to show the video message for the receiving party as an indication of the incoming telephone call and identification of the calling party.

18 Claims, 4 Drawing Sheets

(56) References Cited

U.S. PATENT DOCUMENTS

| | | | |
|---|---|---|---|
| 8,160,221 B2* | 4/2012 | Henderson | 379/142.04 |
| 8,817,062 B2* | 8/2014 | Howarter et al. | 348/14.01 |
| 2004/0203835 A1 | 10/2004 | Trottier et al. | |
| 2007/0297587 A1* | 12/2007 | Urban et al. | 379/142.17 |
| 2009/0214013 A1* | 8/2009 | Cassanova et al. | 379/142.04 |
| 2010/0020951 A1 | 1/2010 | Basart et al. | |
| 2013/0083150 A1 | 4/2013 | Howarter et al. | |

OTHER PUBLICATIONS

U.S. Appl. No. 13/248,969; Final Rejection dated Dec. 17, 2013; 12 pages.

U.S. Appl. No. 13/248,969; Notice of Allowance dated Apr. 21, 2014; 18 pages.

U.S. Appl. No. 13/248,969; Issue Notification dated Aug. 6, 2014; 1 page.

* cited by examiner

ON-SCREEN CALLER ID WITH VIDEO PLAYBACK AND STORAGE CAPABILITY

CROSS REFERENCE TO RELATED APPLICATIONS

This application is a continuation of U.S. patent application Ser. No. 13/248,969, filed Sep. 29, 2011 and titled, "On-Screen Caller ID with Video Playback and Storage Capability", which is hereby incorporated by reference in its entirety.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to telecommunications, and more particularly, to tools and techniques for identifying the calling party of an incoming telephone call by displaying a video message that is associated with the calling party.

BACKGROUND

Caller identification, or caller ID, is a telephony service offered by many telecommunication service providers to enable their customers to identify the calling party of an incoming telephone call (e.g., POTS call, VoIP call, etc.) with a set of identifying information. Typically, the caller identification information of the calling party is transmitted to the receiving party as the incoming telephone call is terminated at the receiving party's premises. The transmitted information is received and then routed to a display screen located on the receiving party's premises. Commonly, such display screens are LCD screens found incorporated in the receiving party's telephone unit, telephone answering machine, dedicated caller ID box, or other devices. Additionally, some spoken caller ID devices have text-to-speech capability that announces the caller identification information when it is available.

Typically, caller identification information comprises the calling party's household or business name, telephone number, and/or city/state location. When this information is transmitted and displayed, the receiving party is given the opportunity to view the caller identification information and identify the calling party prior to answering the incoming telephone call. This service enables the receiving party to screen telephone calls and have the option of answering the call, ignoring the call, or, in some cases, sending the call to voicemail. The caller identification information may be stored at the receiving party's premises, typically within the device displaying the information. An incoming call history log may be retrieved and utilized for returning any missed calls.

Although household or business name, telephone number, and/or city/state information is helpful for identifying the calling party, the information often will not be sufficient to truly identify a calling party (if, for example, the caller identification information includes only a telephone number, and the receiving party cannot easily recall the identity of the person with that telephone number). Moreover, even if recognizable, such information is not personalized by the calling party, which may be preferred in many settings. For instance, a personalized audio-visual caller identification information message could be in a foreign language or visual cue that is communicable to the receiving party. The traditional caller identification schemes do not convey personalized identification cues such as visual, video or voice associated with the calling party. Additionally, retrieving traditional caller identification information above requires the receiving party to first locate and access the display unit, which can be inconvenient and may result in missed calls.

Hence, there is a need for more robust caller identification technologies.

BRIEF SUMMARY

Certain embodiments provide tools and techniques to enable video enhancements identifying the calling party of an incoming telephone call. In an aspect of some embodiments, a video message from the calling party is sent to the receiving party through a communication channel in the provider network. Upon receiving an incoming telephone call at the provider network, the video message can be associated with the incoming telephone call, and routed to video screen associated with the receiving party to show the video message for the receiving party as an indication of the incoming telephone call and identification of the calling party.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

Merely by way of example, one set of embodiments provides systems. An exemplary system might comprise a provider network, a communication channel to receive a video message at the provider network, a computer system in communication with the provider network and a visual display screen (e.g., a television, computer monitor, tablet, smartphone etc.). The computer system, in an aspect, might comprise one or more processors and a computer readable medium in communication with one or more processors. In some embodiments, the computer readable medium has encoded thereon a set of instructions executable by the computer system to perform one or more operations.

In a particular embodiment, the set of instructions might comprise instructions for receiving the video message from a calling party via the communication channel. The set of instructions might further comprise instructions for associating the video message with an incoming telephone call received at the provider network and directed to a receiving party. In some cases, the set of instructions further comprises instructions for routing the video message through the provider network to a display screen associated with the receiving party of the telephone call. Thus, the video message can, in an aspect, serve as an indication of the incoming telephone call and/or as identification of the calling party.

Another set of embodiments provides methods. An exemplary method might comprise providing a communication channel at a provider network to receive a video message from a calling party. The video message may be received at the provider network, and in some cases, an incoming telephone call directed to a receiving party may be received at the provider network. The video message, in an aspect, may be associated with the incoming telephone call.

In a particular embodiment, the video message received at the provider network may be routed to a visual display screen. In another embodiment, the set-top unit may cause the visual display screen to display the video message for the receiving party. Thus, the video may serve, in an aspect, as an indication of the incoming telephone call and identification of the calling party.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
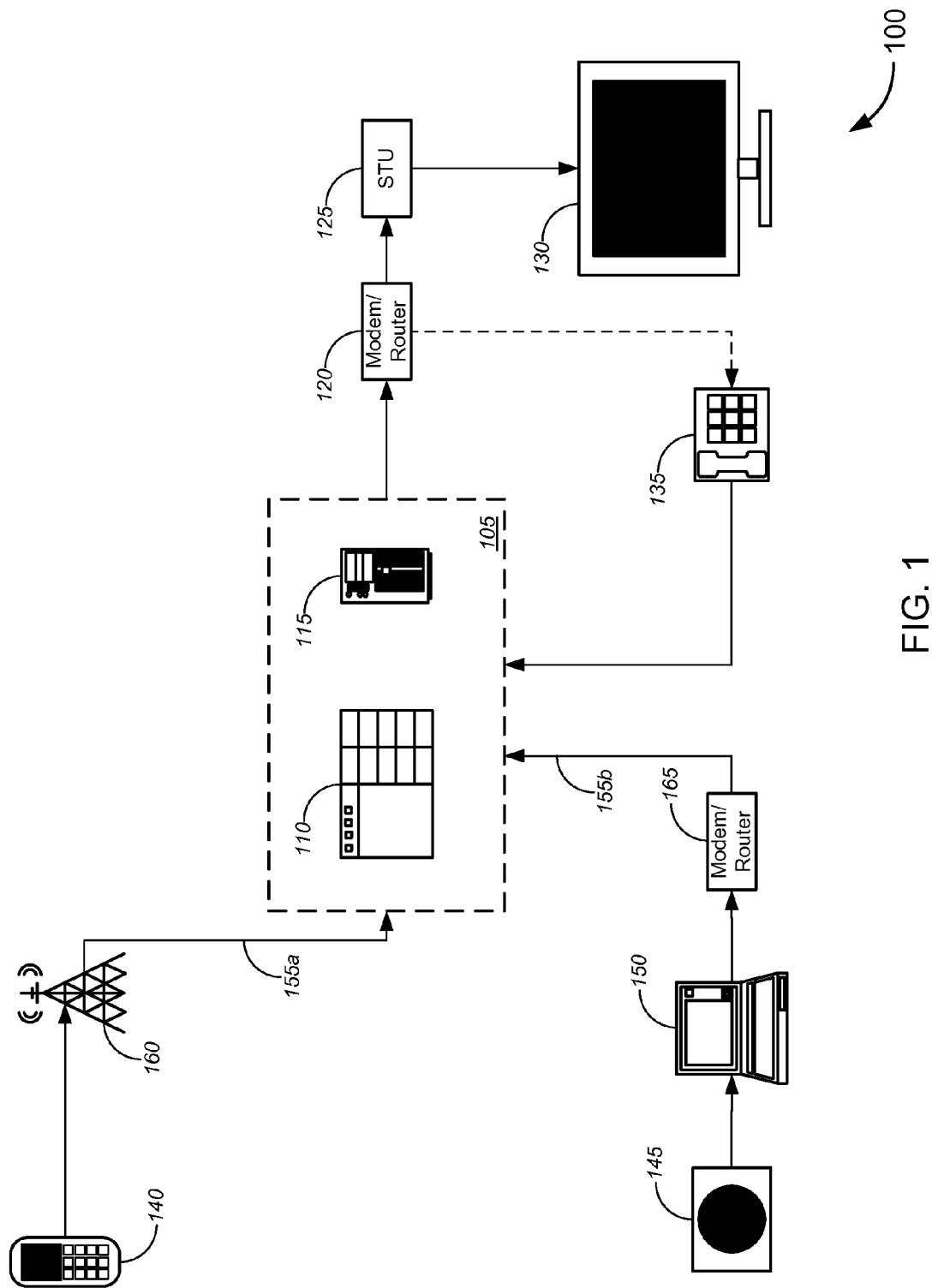
FIG. 1 is a generalized schematic diagram illustrating components of the on-screen caller ID with video playback system in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Features of Certain Embodiments

Certain embodiments utilize video messages for the caller identification of incoming telephone calls to the receiving party. In a novel aspect of some embodiments, a video message can be created by the calling party, using any device capable of recording video, and in some cases, uploaded and/or transmitted through a communication channel to the provider network. After creating and uploading the video message to the network, perhaps through a web-based user interface for media storage and retrieval of video messages, the calling party can place a telephone call to the receiving party with a wireless phone (which might also be the device that recorded the video), a landline phone, a VoIP phone, or any other device capable of making voice calls. As the call is received at the provider's network, the video message created by the calling party can be associated with the incoming call. In some cases, this association can be accomplished by matching the automatic number identification (ANI) assigned by the telephony service to the calling party's phone with the video message. In some cases, the video message may also be appended or modified (e.g., using overlay graphics) with the same ANI of the calling party, the calling party's phone number, or any other pertinent and available information.

The video message can then be routed to the called party's set-top unit. The set-top unit may include a user interface for options involving receiving video messages with incoming telephone calls. In some cases, the set-top box communicates with the visual display screen to cause the display screen to play the video message as the telephone call is terminated at the receiving party's telephone (and/or before or after the call is terminated). (The terms, "originate" and "terminate," are used herein in accordance with their standard meaning in the art: the calling party originates a call from the calling party's phone, and the call is terminated at the receiving party's phone to complete the connection for the call.) The video message could be displayed, for example, in a window on the visual display screen for a picture-in-picture effect, with the original program continuing uninterrupted in the background. In another embodiment, the video might be displayed on the entire (or substantially the entire) display screen. In some cases, the set-top unit might mute the sound of the original program and/or pause the original program in order to play the sound accompanying the video message.

In accordance with one set of embodiments, upon receiving notification of the incoming telephone call with the display of the video message, the receiving party can provide input through a user interface in the set-top unit to select from various options for handling the incoming telephone call. Such user options may include, but are not limited to, storing the video message, setting the video message as a default identification for the calling party's future calls, blocking the video message, and receiving additional video messages during the call. In an aspect, the video message can be played substantially simultaneously with the termination of the incoming telephone call, such that the receiving party is immediately notified of the incoming telephone call and can select without delay or interruption whether to answer the call or send the call to voicemail. Instructions to answer the call or send the call to voicemail might, in some cases, be user selections communicated from the user to the set-top box and executed by the set-top box on the telephone.

Specific Implementation Details of Certain Embodiments

FIG. 1, illustrates an exemplary system 100 that can be used to provide video caller identification services in accordance with one set of embodiments. The system 100 comprises a provider network, which typically will be operated by a telecommunication service provider. In some cases, the provider network 105 can be a public switched telephone network ("PSTN"). In other cases, the provider network 105 might be a data network or a mixed voice/data network. In a particular embodiment, the provider network might include a subscriber access network, including any appropriate hardware to provide subscriber access to the network. Merely by way of example, if the access network is a digital subscriber line ("DSL") network, the access network might comprise a main distribution frame ("MDF") at a central office and/or DSL access multiplexor ("DSLAM") near the subscriber's premises (neither of which is illustrated on FIG. 1), or if the access network is a fiber to the premises ("FTTP") network, such as a gigabit passive optical network ("GPON"), the access network might include an optical line terminal ("OLT") at a central office and optical network unit ("ONU") near the subscriber's premises (neither of which is illustrated in FIG. 1).

As illustrated, the provider network 105 includes a telephony switch 110, which can route calls between the subscriber and others, and can terminate incoming calls directed to the subscriber's telephone number. In various embodiments, the switch 110 might be a conventional central office switch (e.g., a service switching point ("SSP") in a signaling system no. 7 ("SS7") network), an Internet protocol ("IP") switch (e.g., a voice over IP ("VoIP") switch), a wireless switch (e.g., a mobile switching center ("MSC") in a wireless network), and/or the like.

In another aspect, the provider network 105 also includes a server 115 that can be used to support the video messaging functions described herein. In some cases, the server 115 can be used to provide web pages, e.g., as a user interface as described below, to allow a calling party to upload video messages, to store and/or provide video messages to the receiving party, to receive user input from the receiving party, and/or the like. In some cases, the server 115 might be a standalone application server. In other cases, the functionality of the server might be incorporated into other network devices, such as a LAN switch, the telephony switch 110, and/or the like.

As noted above, the provider network 105 might also further comprise a data access network hardware (not illustrated on FIG. 1), which might include various hardware, such as the MDF/DSLAM of a typical DSL network, the OLT/ONU of a typical GPON network, the cable modem termination system ("CMTS") of a typical cable/DOCSIS access network, and/or the like. This data access network hardware provides data connectivity for the subscriber, typically through gateway and/or modem 120, which can include any subscriber termination equipment necessary for the access network (e.g., a cable modem, a DSL modem, network termination equipment ("NTE"), etc.).

As described in further detail below, the system can provide the ability to display a video message on a display screen. Accordingly, in some embodiments, the system 100 further comprises a television set-top unit 125, which is in communication with the gateway/modem 120. In an aspect, the set-top unit can be any standard set-top unit that is used to receive television signals from the provider and cause a television 130 to display video based on those signals. Examples include cable set-top boxes, vDSL set-top boxes, IPTV set-top boxes, dongles, DVRs, cable cards, networked video players (such as the AppleTV™ device, the Roku™ streaming device, etc.), video game consoles, or any other combination of software and/or hardware that can receive data from the provider network 105 and output video to the television 130. In some cases, the functionality of the set-top unit 125 can be incorporated by the television itself 130. In other cases, the functionality of the set-top unit 125 (at least with respect to the video messaging capabilities of various embodiments) can be incorporated into the gateway/modem 120 and/or a personal computer (not shown in FIG. 1) in communication with the gateway/modem. In an aspect of some embodiments, the set-top unit 125 is configured (e.g., using software or firmware instructions) to provide the functionality described herein.

While the system 100 illustrated by FIG. 1 employs a television 130 as a visual display screen, it should be appreciated that other embodiments can utilize different display screens. Merely by way of example, in some cases, a computer monitor might be used as a display screen. In other cases, a display of a mobile communication device (e.g., a wireless phone, tablet computer, etc.) in communication with the gateway/modem 120 (e.g., via WiFi communications) could be used as a display screen. In such cases, a computer in communication with the monitor and/or the mobile communication device might be configured (e.g., with software or firmware instructions) to provide the functionality described herein for displaying video messages.

In some cases, the receiving party's telephone 135 might be used as a visual display device, if the telephone 135 includes video display capability. It is anticipated that the telephone 135 will be a landline telephone in many embodiments, although a wireless (e.g., GSM, CDMA, etc.) could be used in other embodiments. The telephone 135 might be a POTS phone, a VoIP phone, and/or any other type of phone that is capable of receiving voice calls (e.g., voice calls originating from a calling telephone over the PSTN). The telephone 135 might communicate with the switch 110 directly (e.g., over a POTS line) or through the gateway/modem 120 (e.g., over a VoIP connection, through a DSL filter, etc.).

While the functionality of the system 100 in accordance with one set of embodiments is described in further detail with respect to the method 200 described below, in general, the system 100 operates to receive a video message from a calling party and display that video message for the receiving party on a display screen (e.g., the television 130). The video message can be recorded on a device of the calling party's choosing. Merely by way of example, it is envisioned that the calling party might use a video camera on a wireless phone 140 to record the video message. Alternatively, the calling party might record the video message with a separate video camera 145 and upload the video message to a personal computer 150 operated by the calling party (such a video camera might be integrated with the personal computer 150, such as a webcam or the like). Embodiments are not limited to the means selected by the calling party to record the video message, so long as that message can be received at the provider network 105, as described in further detail below.

In some embodiments, then, the system 100 further includes a communication channel 155 for the provider network to receive the recorded video message from the calling party. The nature of the channel 155 will often depend on the device used by the calling party to provide the video message. As illustrated, for example, the communication channel might be a connection 155a between the switch and a wireless phone (e.g., through a wireless network, which can include, for example, a wireless base station 160 in communication with the wireless phone 140, and/or any other standard wireless network components). The video message might be received over the channel 155a from the wireless phone 140 using IP communications, as a multimedia messaging service ("MMS") message, and/or the like.

The system, in some embodiments, might support multiple communication channels 155. Merely by way of example, as illustrated, the system 100 includes a communication channel 155b (e.g., via the Internet) that allows IP communication with the calling party's computer 150 to allow upload of a video message taken with the video camera 145, e.g., via a router 165 (which might be a broadband router at the calling party's premises, an edge router in the provider network 105, and/or any combination of multiple routers on the Internet and/or the provider network 105 between the personal computer 150 and the switch 110 (and/or server 115).

Based on the disclosure herein, one skilled in the art should appreciate that the nature of the communication channel 155 between the calling party and the provider network 110 is discretionary, and that any type of communication channel 155 can be implemented, so long as it supports transmission of the video message from the calling party to the provider network. Merely by way of example, in some cases, the channel 155 might comprise a web site at which the calling party can upload the video message and provide other pertinent information (such as one or more calling telephone numbers with which to associate the video message). In other cases, if the channel 155 comprises a MMS message, the system 100 might be configured to automatically associate the video message with the telephone number of the wireless phone (e.g., wireless phone 140) from which the MMS message containing the video message was received. Thus, the examples described above should not be considered limiting with regard to the types of communication channels 155 that can be supported and/or implemented by different embodiments.

In accordance with one embodiment, at some point after receiving the video message from the calling party, the system 100 (and, more particularly, the switch 110) receives an incoming telephone call from the calling party directed to the receiving party. (In some embodiments, however, the system 100 might receive the incoming call and the video message substantially simultaneously. In other embodiments, the switch 110 might be configured to receive the incoming call and, before terminating the call to the receiving party, prompt the calling party to provide a video message if desired. In such cases, if the calling party indicates a desire to provide a video message, the switch 110 might be configured to wait to terminate the call to the receiving party until the system 100 has received the video message from the calling party.)

In an exemplary embodiment, upon detecting that the incoming call originates from a calling party that has provided a video message, the server 115 transmits the video message to the gateway/modem 120 at the receiving party's premises. The set-top box 125 that is connected to the gateway 120 sends the video message to the television 130 for display of the incoming video message. The video message therefore can serve as video caller identification displayed on the television 130 (or other display screen). In some cases, the calling party's telephone number, name/business, city/state location (and/or any other ANI information) may also be displayed with the video message.

In some cases, the video message may continue to play after the switch 110 terminates the phone call to the receiving party's telephone 135. In other cases, as described in further detail below, the video message might be played before the call is terminated to the telephone 135 (e.g., to allow the receiving party to decide whether to take the call before the call is terminated).

Embodiments are not limited to any particular type of incoming call. Merely by way of example, the incoming call might be originated from the wireless phone 140, the PC 150 (e.g., using a VoIP client), and/or the like. In other embodiments, the call might be received at the switch 110 as a POTS call over the PSTN, irrespective of how the call was originated or what gateway might have handled the call on the originating end.

In some embodiments, the video message is recorded just prior to sending the video message and originating the telephone call to the receiving party. In other embodiments, previous video messages received by the recipient may be stored (either at the switch 110 or other component within the network 105, such as at an application server 115, etc. or locally at the set-top box 125 and selected as the default video message for a particular calling party's future incoming calls.

Figure 2:
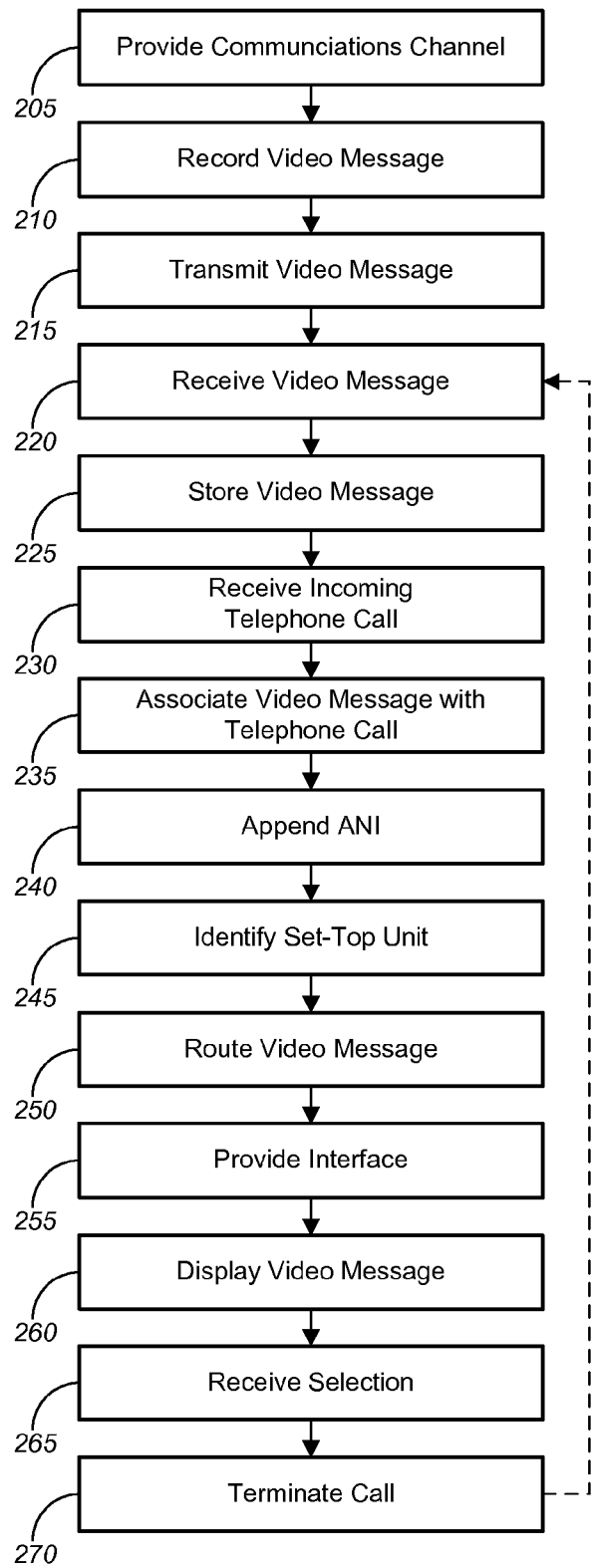
FIG. 2 is a process flow diagram illustrating the method of achieving on-screen caller ID with video playback in accordance with various embodiments.

FIG. 2 illustrates a method that can be used to provide on-screen caller identification with video playback. While the techniques and procedures of FIG. 2 are depicted and/or described in a certain order for purposes of illustration, it should be appreciated that certain procedures may be reordered and/or omitted within the scope of various embodiments. Moreover, while the methods illustrated by FIG. 2 can be implemented by (and, in some cases, are described below with respect to) the system 100 of FIG. 1 (or components thereof), these methods may also be implemented using any suitable hardware implementation.

Turning to FIG. 2, the method 200 comprises, at block 205, providing a communication channel at the provider network to receive a video message from the calling party. Examples of such channels are described above, although embodiments are not limited to these exemplary channels. At block 210, the calling party records a video message, e.g., using a video camera, wireless phone, etc., as described above, and at block 215 the calling party transmits the video message to the provider system (e.g., using the communication channel provided for that purposes). At block 220, the provider network (and/or a component thereof, such as the switch, a web server, etc.) receives the video message. In some cases, the video message can be stored (block 225), e.g., at a data store in the provider network and/or in communication with the provider network, at a receiving party's set-top unit, and/or the like. In some cases, the video message may be stored temporarily in the provider network and/or might be stored relatively more long term at the set-top unit, as described in further detail below. In other cases, the video message might be stored only until transmitted to the receiving party. In yet other cases, the video message might be stored relatively more permanently in the provider network (or at a data store in communication with the provider network).

At block 230, the provider network (and/or a component thereof, such as the telephony switch) receives an incoming telephone call from the calling party. The system then determines that the incoming telephone call corresponds to the video message and therefore associates the incoming call with the video message (block 235). This determination can be made in a number of ways. Merely by way of example, in some cases, the system determines that the call is related to the video message based on the identity of the calling party and/or the telephone number from which the call originates (either or both of which, in some cases can be detected, e.g., from ANI information accompanying the incoming call) and/or on the destination number for the call (i.e., the receiving party's telephone number), if, for example, the calling party had indicated that the video message should be used only with calls to a particular receiving party. In other cases, as noted above, the calling party might provide the video message after the call has been originated; in this case, the system might determine that the video message should be associated with the call on the basis that the video message was submitted in response to the prompt provided by the switch itself. A variety of other techniques can be used to associate the video message with the call in accordance with different embodiments, so long as the system determines that the video message should be provided to the receiving party in conjunction with an incoming call.

The method 200 might further comprise appending the ANI of the calling party to the video message (block 240). This procedure can be accomplished in a number of ways. Merely by way of example, in some cases, the system might have an image processor that is configured to add some or all of the ANI information (e.g., as an overlay) to the video message before sending the video message to the set-top unit. In other cases, the system might simply transmit the ANI information along with the video message to the set-top box, which might be configured to provide the ANI information along with the video message (e.g., as an overlay over the video message; above, below, and/or to the side of the video message in a video frame, etc.).

At block 245, the system identifies the set-top unit as associated with the receiving party, such that the video message may be appropriately delivered to the receiving party's premises. Merely by way of example, in many embodiments, the receiving party's set-top unit is addressable (e.g., with an IP address assigned to the set-top unit and/or to an associated gateway/modem) or is otherwise identifiable to the provider network; in such cases, the provider might maintain a database that correlates the address or identity of the set-top unit with one or more telephone numbers associated with the receiving party. The system, then, upon identifying the destination number for the call and determining that a video message should be associated with that call, can use the destination number to query such a database to identify one or more set-top units that is associated with that destination number (and, by extension, with the receiving party). Other techniques can be used to perform this identification as well.

At block 250 the system routes the video message from the provider network (and/or a subscriber access network, if separate from the provider network) to the receiving party's set-top unit. The video message can be transmitted to the set-top unit in a variety of ways. In some cases, the video message might be integrated with (and/or might temporarily replace) a broadcast (or multicast or unicast) video stream that is being transmitted to the set-top unit for ordinary television viewing. In this case, the set-top unit need not have any customer configuration to display the video message, because it simply receives the message as part of a normal video stream. In other cases, however, the video message might be sent as a separate data message.

In some cases, the system (or a component thereof, such as the set-top unit, a computer in communication with the gateway/modem, a wireless phone, etc.) provides a user interface (block 255) to allow the user to interact with the system, including providing user input with instructions regarding the handling of video messages and/or calls. In many cases, providing a user interface will comprise providing one or more display screens, each of which includes one or more user interface elements. As used herein, the term "user interface element" (also described as a "user interface mechanism" or a "user interface device") means any text, image, or device that can be displayed on a display screen for providing information to a user and/or for receiving user input. Some such elements are commonly referred to as "widgets," and can include, without limitation, text, text boxes, text fields, tables and/or grids, menus, toolbars, charts, hyperlinks, buttons, lists, combo boxes, checkboxes, radio buttons, and/or the like. It should be appreciated that the choice of user interface elements for a particular purpose is typically implementation-dependent and/or discretionary.

As noted above, the user interface allows for interaction between the receiving party and the system. For instance, the set-top unit might provide an on-screen menu (accessible with a remote control, keyboard, mobile phone or smartphone, etc.) to allow the user to select to display the video message immediately, after terminating the call, or not at all; to allow the user to select display options for the video message (e.g., full-screen video, picture-in-picture mode, etc.). The user might also be given the option not to accept the call, in which case the system might not terminate the call to the user's (receiving party's) telephone number and/or might instead send the call directly to voicemail. As noted above, in some cases, this user interface is provided by the set-top unit, such that the set-top unit receives user input and communicates the user instructions to other system components as necessary.

Merely by way of example, in a particular embodiment, upon receiving a video message (or notification of a video message, which might be transmitted by the switch or other system component prior to transmitting the video message), the system might display a notification to the receiving party that a video message is available, and the user interface might provide a mechanism for the receiving party to indicate that they would like to view the video message. The set-top unit, upon receiving this input might commence with displaying the video message (or, more precisely) causing the display device to display the video message, for example, by sending a video stream to the video display device) and/or might request the video message from the system (if it has not been provided already) and display the video message upon reception (and/or as it is streamed from the server). Alternatively, in some embodiments, the set-top box might commence playing the video message upon receipt, without seeking user input. In any event, the method 200 can comprise causing the display screen to display the video message for the receiving party (block 260).

In some cases, the system merely plays the video message for the receiving party, and the call is terminated to the receiving party's telephone regardless. In other cases, however, the user interface can also be configured to receive input from the user in response to the video message. Merely by way of example, in one embodiment, the user interface allows the user to select whether to receive the telephone call. Upon receiving (e.g., through the user interface) a selection indicating that the user would like to receive the call (block 265), the set-top unit might be configured to transmit a message to the system that the call should be terminated. Upon receiving such a message, the telephony switch then can terminate the call to the receiving party's telephone (block 270), e.g., in a conventional manner, and the receiving party can answer the call.

A number of variations are possible in accordance with different embodiments. Merely by way of example, in some embodiments, the user interface might provide the receiving party with the ability to select whether to send the incoming call directly to voice mail, to have the system provide a pre-recorded message to the calling party, and/or the like. In other cases, if the system's database includes more than one phone number associated with the receiving party, the user interface might allow the receiving party to select at which of the numbers the switch should terminate the incoming call. Thus, for example, the receiving party could instruct the system (through the user interface, for example) to send the incoming call the receiving party's landline, wireless line, VoIP line, etc.

In particular embodiments, the calling party may send additional video messages to the receiving party who is also able to receive and display the messages concurrently with an ongoing telephone call with the calling party. In another case, the user interface in the set-top box may allow the user to interact with the video caller identification system settings, where a variety of user preferences may be provided in accordance with various embodiments, including without limitation playback options of the video messages such as an interface to allow the receiving party to specify whether the video messages should be displayed and when. For instance, the video message could be displayed simultaneously with terminating the incoming telephone call at the telephone associated with the receiving party; or, the video message could be stored for play after termination of the incoming call.

In some instances, the user interface may require input from the user to display the video message before the visual display screen begins to play the video message for every incoming message. In other particular examples, the set-top box could be set by the user to automatically play video messages upon receiving them; select auto-play for certain calling parties, or to display a frozen still image of the video message prompting user input for play. Many preferences for the on-screen video message delivery may be available for the user to adjust and set through a graphical on-screen menu provided through the set-top unit. Additionally, a local video storage device could be employed to store the video message for future retrieval.

Further user preferences that may be set through the user interface, as described in some embodiments, might include selecting the specific video message as a "favorite" video caller identification message for the calling party, such that the favorite message would be played as a default for all future incoming telephone calls until overridden. User preferences might also include blocking videos from certain calling parties, accepting videos from a specific set of calling parties, and displaying additional video messages during the ongoing telephone call. In one aspect, the additional video messages could be sent and received during a telephone call with the calling party, and played on-screen.

Merely by way of example, in some embodiments, the computer system within the set-top box may be configured to communicate with a client computer at the receiving party's premises via a dedicated application running on the client computer; in this situation, the user interface within the set-top box might be displayed by the client computer, based on data and/or instructions provided by the computer system of the set-top box. In this situation, providing the user interface might comprise providing instructions and/or data to cause the client computer to display the user interface. In other embodiments, the user interface may be provided from a web site, e.g., by providing a set of one or more web pages, which might be displayed in a web browser running on the user computer at the receiving party's premises and/or might be served by a web server (not shown on FIG. 1). In various embodiments, the computer system in the set-top box might comprise the web server and/or be in communication with the web server, such that the computer system provides data to the web server to be incorporated in web pages served by the web server for reception and/or display by a browser at the user computer at the receiving party's premises.

In another inventive aspect, a user interface for the calling party may be implemented in the video caller identification system (e.g., as a web page, etc.). In the calling party's user interface, the calling party might be able to specify for each receiving party a default video message as the video caller identification for incoming calls directed to that party. In one instance, the calling party might have a media database of video messages from which to choose the video message to transmit to the receiving party. The user interface could append the calling party's ANI number to the video message that the calling party chooses to send. In many cases, the video message used for video caller identification need not be recorded immediately before placing the telephone call. A formerly recorded video message may be uploaded for transmission. Many additional variations of user selections may be implemented by the calling party's user interface while still maintaining within the specifications and purposes of this invention.

Figure 3:
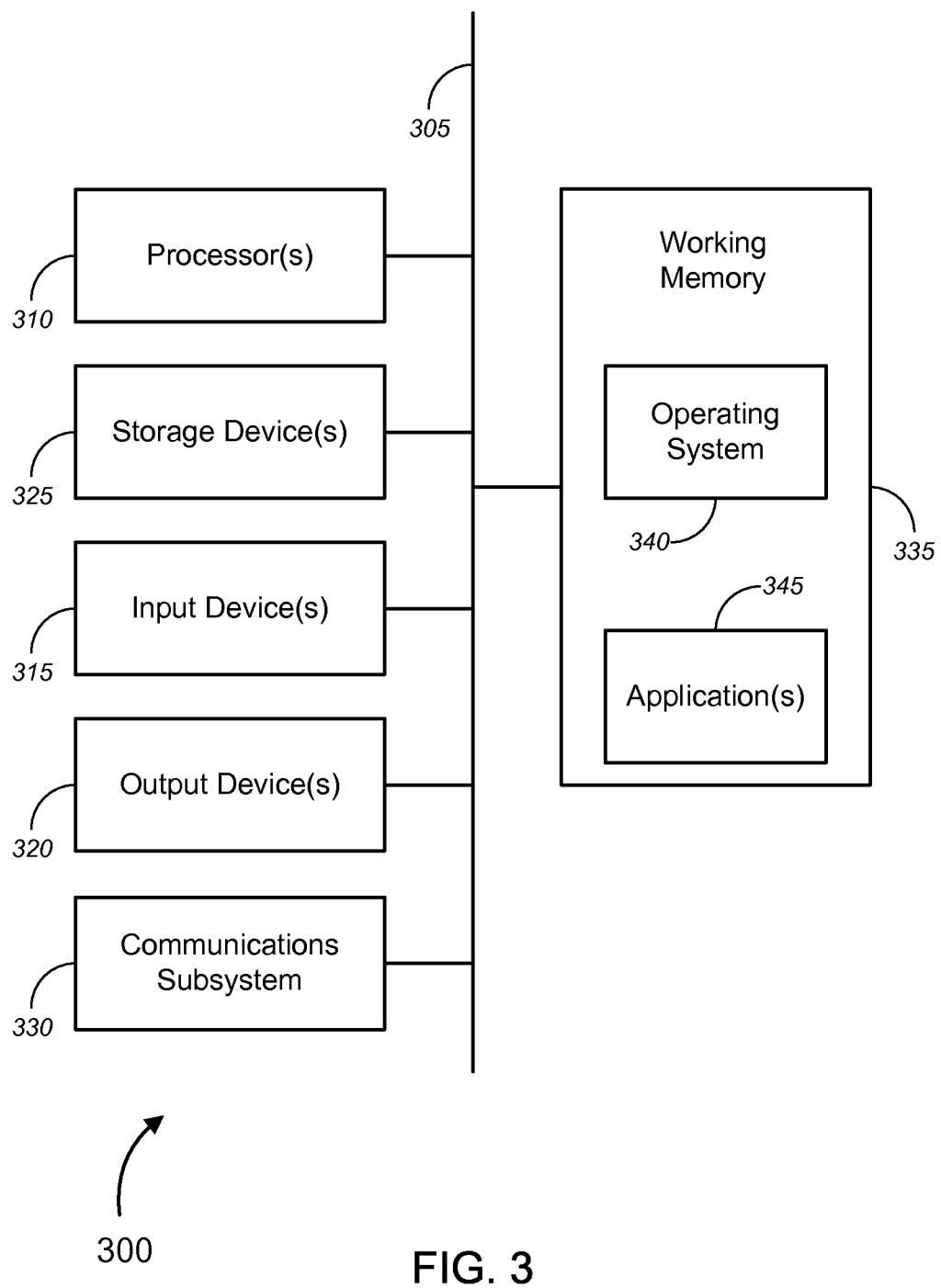
FIG. 3 is a schematic illustration of one embodiment of a computer system that can perform the methods provided by various other embodiments.

FIG. 3 provides a schematic illustration of one embodiment of a computer system 300 that can perform the methods provided by various other embodiments, as described herein, and/or can function as a set top box, server computer, personal computer, switch, networking device, and/or the like. It should be noted that FIG. 3 is meant only to provide a generalized illustration of various components, of which one or more (or none) of each may be utilized as appropriate. FIG. 3, therefore, broadly illustrates how individual system elements may be implemented in a relatively separated or relatively more integrated manner.

The computer system 300 is shown comprising hardware elements that can be electrically coupled via a bus 305 (or may otherwise be in communication, as appropriate). The hardware elements may include one or more processors 310, including without limitation one or more general-purpose processors and/or one or more special-purpose processors (such as digital signal processing chips, graphics acceleration processors, and/or the like); one or more input devices 315, which can include without limitation a mouse, a keyboard and/or the like; and one or more output devices 320, which can include without limitation a display device, a printer and/or the like.

The computer system 300 may further include (and/or be in communication with) one or more storage devices 325, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 300 might also include a communications subsystem 330, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 330 may permit data to be exchanged with a network (such as the network described below, to name one example), with other computer systems, and/or with any other devices described herein. In many embodiments, the computer system 300 will further comprise a working memory 335, which can include a RAM or ROM device, as described above.

The computer system 300 also may comprise software elements, shown as being currently located within the working memory 335, including an operating system 340, device drivers, executable libraries, and/or other code, such as one or more application programs 345, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 325 described above. In some cases, the storage medium might be incorporated within a computer system, such as the system 300. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 300 and/or might take the form of source and/or installable code, which, upon compilation and/or installation on the computer system 300 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 300) to perform methods in accordance with various embodiments of the invention. According to a set of embodiments, some or all of the procedures of such methods are performed by the computer system 300 in response to processor 310 executing one or more sequences of one or more instructions (which might be incorporated into the operating system 340 and/or other code, such as an application program 345) contained in the working memory 335. Such instructions may be read into the working memory 335 from another computer readable medium, such as one or more of the storage device(s) 325. Merely by way of example, execution of the sequences of instructions contained in the working memory 335 might cause the processor(s) 310 to perform one or more procedures of the methods described herein.

The terms "machine readable medium" and "computer readable medium," as used herein, refer to any medium that participates in providing data that causes a machine to operation in a specific fashion. In an embodiment implemented using the computer system 300, various computer readable media might be involved in providing instructions/code to processor(s) 310 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 325. Volatile media includes, without limitation, dynamic memory, such as the working memory 335. Transmission media includes, without limitation, coaxial cables, copper wire and fiber optics, including the wires that comprise the bus 305, as well as the various components of the communication subsystem 330 (and/or the media by which the communications subsystem 330 provides communication with other devices). Hence, transmission media can also take the form of waves (including without limitation radio, acoustic and/or light waves, such as those generated during radio-wave and infrared data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 300. These signals, which might be in the form of electromagnetic signals, acoustic signals, optical signals and/or the like, are all examples of carrier waves on which instructions can be encoded, in accordance with various embodiments of the invention.

The communications subsystem 330 (and/or components thereof) generally will receive the signals, and the bus 305 then might carry the signals (and/or the data, instructions, etc. carried by the signals) to the working memory 335, from which the processor(s) 305 retrieves and executes the instructions. The instructions received by the working memory 335 may optionally be stored on a storage device 325 either before or after execution by the processor(s) 310.

Figure 4:
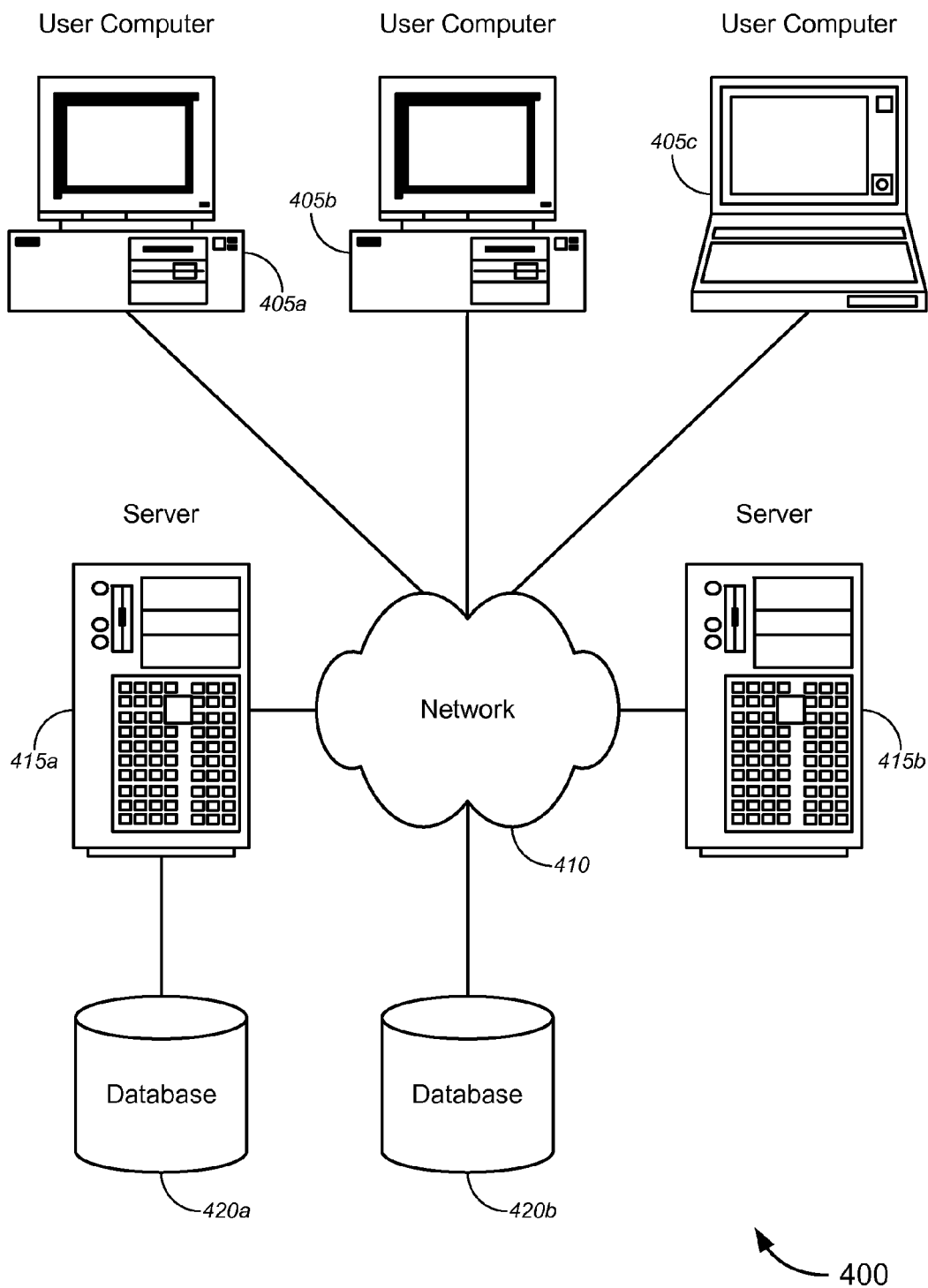
FIG. 4 is a schematic diagram of a system that can be used in accordance with one set of embodiments.

As noted above, a set of embodiments comprises systems for video caller identification. FIG. 4 illustrates a schematic diagram of a system 400 that can be used in accordance with one set of embodiments. The system 400 can include one or more user computers 405. A user computer 405 can be a general purpose personal computer (including, merely by way of example, desktop computers, laptop computers, handheld computer, tablet computers, video game consoles, set-top units, and the like, running any appropriate operating system, several of which are available from vendors such as Apple, Microsoft Corp., and the like) and/or a workstation computer running any of a variety of commercially-available UNIX™ or UNIX-like operating systems. A user computer 405 can also have any of a variety of applications, including one or more applications configured to perform methods provided by various embodiments (as described above, for example), as well as one or more office applications, database client and/or server applications, and/or web browser applications. Alternatively, a user computer 405 can be any other electronic device, such as a set-top box, thin-client computer, Internet-enabled mobile telephone, and/or personal digital assistant, capable of communicating via a network (e.g., the network 410 described below) and/or of displaying and navigating web pages or other types of electronic documents. Although the exemplary system 400 is shown with three user computers 405, any number of user computers can be supported.

Certain embodiments operate in a networked environment, which can include a network 410. The network 410 can be any type of network familiar to those skilled in the art that can support data communications using any of a variety of commercially-available (and/or free or proprietary) protocols, including without limitation TCP/IP, SNA™, IPX™, AppleTalk™, and the like. Merely by way of example, the network 410 can include a local area network ("LAN"), including without limitation a fiber network, an Ethernet network, a Token-Ring™ network and/or the like; a wide-area network; a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks. In some cases, the network 410 can be implemented as the PSTN and/or access network described above.

Embodiments can also include one or more server computers 415, which can function as a video message server and/or switch, as described above. Each of the server computers 415 may be configured with an operating system, including without limitation any of those discussed above, as well as any commercially (or freely) available server operating systems. Each of the servers 415 may also be running one or more applications, which can be configured to provide services to one or more clients 405 and/or other servers 415.

Merely by way of example, one of the servers 415 may be a web server, which can be used, merely by way of example, to process requests for web pages or other electronic documents from user computers 405. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 405 to perform methods of the invention.

The server computers 415, in some embodiments, might include one or more application servers, which can be configured with one or more applications accessible by a client running on one or more of the client computers 405 and/or other servers 415. Merely by way of example, the server(s) 415 can be one or more general purpose computers capable of executing programs or scripts in response to the user computers 405 and/or other servers 415, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle™, Microsoft™, Sybase™ IBM™ and the like, which can process requests from clients (including, depending on the configuration, dedicated database clients, API clients, web browsers, etc.) running on a user computer 405 and/or another server 415. In some embodiments, an application server can create web pages dynamically for displaying the information in accordance with various embodiments, such as a video message from the calling party, and in some cases the calling party's telephone number, name/business, city/state location (and/or any other ANI information). Data provided by an application server may be formatted as one or more web pages (comprising HTML, JavaScript, etc., for example) and/or may be forwarded to a user computer 405 via a web server (as described above, for example). Similarly, a web server might receive web page requests and/or input data from a user computer 405 and/or forward the web page requests and/or input data to an application server. In some cases a web server may be integrated with an application server.

In accordance with further embodiments, one or more servers 415 can function as a file server and/or can include one or more of the files (e.g., application code, data files, etc.) necessary to implement various disclosed methods, incorporated by an application running on a user computer 405 and/or another server 415. Alternatively, as those skilled in the art will appreciate, a file server can include all necessary files, allowing such an application to be invoked remotely by a user computer 405 and/or server 415.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 420, which can be used to store subscriber (receiving party) information (as described above), calling party information, video messages, and/or the like. The location of the database(s) 420 is discretionary: merely by way of example, a database 420a might reside on a storage medium local to (and/or resident in) a server 415a (and/or a user computer 405). Alternatively, a database 420b can be remote from any or all of the computers 405, 415, so long as it can be in communication (e.g., via the network 410) with one or more of these. In a particular set of embodiments, a database 420 can reside in a storage-area network ("SAN") familiar to those skilled in the art (Likewise, any necessary files for performing the functions attributed to the computers 405, 415 can be stored locally on the respective computer and/or remotely, as appropriate.) In one set of embodiments, the database 420 can be a relational database, such as an Oracle database, that is adapted to store, update, and retrieve data in response to SQL-formatted commands. The database might be controlled and/or maintained by a database server, as described above, for example. In other embodiments, one or more of the databases 420 might be implemented as other types of data stores (e.g., file systems, etc.)

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method of providing video caller identification, comprising:
    providing a communication channel at a provider network to receive a video message from a calling party;
    receiving the video message at the provider network;
    receiving, at the provider network, an incoming telephone call directed to a receiving party;
    associating, at the provider network, the video message with the incoming telephone call;
    routing the video message through the provider network to a display device associated with the receiving party;
    causing the display device to display the video message for the receiving party;
    providing one or more user interfaces to allow one of the calling party or the receiving party to select the video message as a default message for one or more other telephone calls from the calling party.

2. The method of claim 1, further comprising:
    appending an automatic number identification (ANI) of the calling party to the video message.

3. The method of claim 1, further comprising:
    terminating the telephone call at a telephone associated with the receiving party.

4. The method of claim 3, further comprising:
    providing a user interface to allow the user to select whether to receive the telephone call.

5. The method of claim 1, wherein the video message is displayed simultaneously with terminating the incoming telephone call at a telephone associated with the receiving party.

6. The method of claim 1, wherein the video message is displayed after terminating the incoming telephone call at the receiving party's telephone.

7. The method of claim 1, further comprising:
    providing a user interface to allow the receiving party to specify whether the video message should be displayed; and
    receiving, via the user interface, user input from the user to display the video message;
    wherein causing the display device to display the video message comprises causing the display device to display the visual message in response to the user input.

8. The method of claim 1, further comprising:
    providing a user interface for the receiving party to select the video message as a video caller identification of the calling party for future incoming telephone calls.

9. The method of claim 1, further comprising:
    providing a user interface for the calling party to select the video message as a video caller identification for the telephone call.

10. The method of claim 1, further comprising:
    providing a user interface for the calling party to select the video message as a video caller identification for one or more telephone calls directed to the receiving party.

11. The method of claim 1, further comprising:
    providing a user interface for the receiving party to select the video message as a video caller identification for one or more telephone calls from the calling party.

12. The method of claim 1, wherein the calling party records the video message and sends the telephone call and video message to the receiving party with a smartphone.

13. The method of claim 1, wherein the calling party records the video message and sends the telephone call and video message to the receiving party with a personal computer and internet communication.

14. The method of claim 1, further comprising:
    receiving, from the calling party one or more additional video messages to the receiving party during the telephone call; and
    causing the display device to display the additional video messages during the telephone call.

15. The method of claim 1, further comprising:
    storing the video messages for future playback.

16. The method of claim 1, further comprising:
    providing a user interface for the receiving party to specify from which of a plurality of calling parties the receiving party is willing to accept video messages.

17. A computer system, comprising:
    a provider network;
    a communication channel to receive a video message at the provider network;
    a computer system in communication with the provider network, the computer system comprising:
        one or more processors; and
        a non-transitory computer readable medium in communication with one or more processors, the computer readable medium having encoded thereon a set of instructions executable by the computer system to perform one or more operations, the set of instructions comprising:
            instructions for receiving the video message from a calling party via the communication channel;
            instructions for associating the video message, at the provider network, with an incoming telephone call received at the provider network and directed to a receiving party;
            instructions for routing the video message through the provider network to a set-top unit associated with the receiving party;
            instructions for providing one or more user interfaces to allow one of the calling party or the receiving party to select the video message as a default message for one or more other telephone calls from the calling party; and a display device configured to display the video message for the receiving party.

18. The system of claim 17 wherein the set of instructions further comprises instructions for appending an automatic number identification (ANI) of the calling party to the video message.

\* \* \* \* \*